Figures 1, 2:
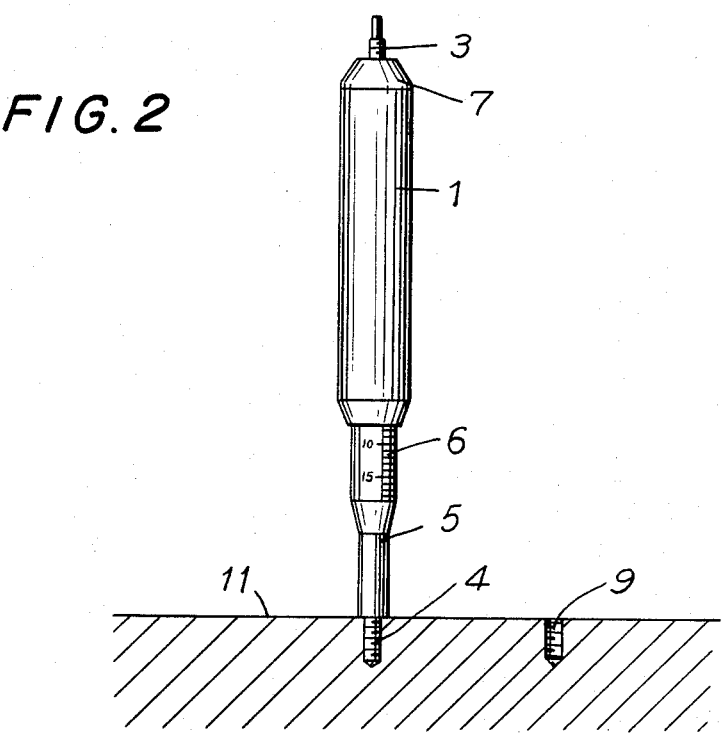

United States Patent [19]

Larsen

[11] Patent Number: 4,519,144
[45] Date of Patent: May 28, 1985

[54] THREAD MEASURING TOOL

[76] Inventor: Leif G. Larsen, Sibbevej 10, 3230 Graested, Denmark

[21] Appl. No.: 568,191
[22] PCT Filed: Mar. 28, 1983
[86] PCT No.: PCT/DK83/00039
 § 371 Date: Dec. 12, 1983
 § 102(e) Date: Dec. 12, 1983
[87] PCT Pub. No.: WO83/03664
 PCT Pub. Date: Oct. 27, 1983

[30] Foreign Application Priority Data
 Apr. 16, 1982 [DK] Denmark .............................. 1698/82

[51] Int. Cl.³ ................................................ G01B 3/48
[52] U.S. Cl. .................... 33/199 R; 33/178 B; 33/169 B
[58] Field of Search ............ 33/178 B, 169 B, 147 K, 33/199 R, 199 B

[56] References Cited

U.S. PATENT DOCUMENTS

| 1,459,896 | 6/1923 | John | 33/169 B |
| 2,330,453 | 9/1943 | Smith | 33/199 R |
| 2,861,347 | 11/1958 | Von Tarnik | 33/199 R X |
| 3,064,355 | 11/1962 | Herman | 33/199 R |
| 3,075,892 | 1/1962 | Stuart | 33/169 B |

FOREIGN PATENT DOCUMENTS 109658 2/1944 Sweden .

OTHER PUBLICATIONS

Western Electric Tech. Dig. #24, 10/71, Gauge for Measuring the Threaded Depth of Holes, J. O. Landis.
IBM Technical Disclosure Bulletin, vol. 13, No. 5, issued Oct. 1970, J. F. Straitwell, "Thread Depth Measurement", p. 1335.

Primary Examiner—Harry N. Haroian
Attorney, Agent, or Firm—Darby & Darby

[57] ABSTRACT

A thread measuring tool consists of a "no go" gauge (3) and a "go" gauge (4) disposed on a through-going spindle in a housing (1) with an end cap (7) and a plug gauge holder (5) capable of being displaced telescopically inside said housing (1).

The plug gauge holder (5) is also provided with a scale (6).

When the plug gauge (4) is screwed into a threaded hole (9), the holder (5) is displaced telescopically inside the housing against a spring contained in said housing.

One can thus check the quality of a thread in a threaded hole (9) and at the same time measure the depth of the thread on the scale (6), which is read off against the edge of the housing.

11 Claims, 2 Drawing Figures

U.S. Patent    May 28, 1985    4,519,144

THREAD MEASURING TOOL

This invention relates to a thread measuring tool with a plug gauge at each end, said gauges being formed as thread gauges of the "go" and "no go" type.

When it is required to check whether the thread inside a bore is correct and within certain given tolerances, a thread gauge is used. A thread gauge for checking the thread inside a bore is normally in the form of a plug gauge with a thread at each end, namely a so-called "go" side and a "no go" side. The "go" side is a profile-ground threaded portion which is machined as closely as possible to the correct profile and the correct dimensions. The "go" side must be able to be screwed in without the use of force. The "no go" side is normally provided with a flank diameter which is just in excess of that permitted by the stated tolerance. The top and bottom of the thread is ground free, thus ensuring that these do not restrict the screwing in, but the "no go" side must not be capable of being screwed into the threaded hole. With such a plug gauge, one can reveal most of the errors which can arise when producing threads in bores.

In connection with work demanding a very accuarate thread, and where one therefore uses a limit gauge to check the quality and the tolerance of the thread, it is also often prescribed that the threaded bore must be of a certain depth, and possibly how great the tolerance must be with regard to the depth. Therefore, after having checked the thread tolerance, one must measure the depth of the hole, for example with a micrometer depth gauge. This, however, provides a check only of the depth of the hole, and not of how far the thread extends down into the hole.

The object of the present invention is to provide a thread measuring tool capable of checking the quality of a thread inside a bore, while at the same time measuring the depth of said bore in that it measures how deep the thread extends down into the hole.

With the measuring tool according to the invention one can carry out a simultaneous measurement of the depth of the threaded hole and the quality of the thread. It is thus possible to ensure that the threaded hole is as specified while at the same time avoiding all the disadvantages and possibilities of error involved in carrying out two measurements, namely a measurement of the depth of the bore and a measurement of the quality of the thread.

By forming the measuring tool according to the present invention, a correct and uniform measurement is achieved every time, the reason being that spring pressure is used to press the plug gauge holder down against that surface in which the threaded hole to be checked has been bored. What is thus provided is a very simple tool which is always ready for use, and wherein the spring pressure always returns the tool to the zero position when it is not in use, and wherein the plug gauge is protected by the holder.

By forming the measuring tool according to the present invention, a very plain and simple mechanical construction is achieved.

The invention will now be explained with reference to the accompanying drawing, which shows an example of a measuring tool according to the invention, in that FIG. 1 shows a cross section of the measuring tool, and FIG. 2 shows the tool during the measurement of a threaded hole.

In FIG. 1 is seen a measuring tool with a plug gauge 4 which comprises the "go" side, and a plug gauge 3 which comprises the "no go" side. The plug gauge 3 can be of the normal "no go" type having a flank diameter corrresponding to the greatest permissible tolerance or corresponding to the smallest permissible tolerance, all depending on the measuring principle one uses.

In a housing 1 is disposed a plug gauge holder 5, which under spring pressure from the spring 8 is biased towards an internal shoulder 12 in the housing 1. Through the whole of the tool there extends a through-going spindle 2, the one end of which forms the "no go" gauge 3 and the other end the "go" gauge 4.

The plug gauge holder 5 is freely rotatable around the through-going spindle 2, this rotation being restricted only by the strength of the spring 8. The holder 5 is provided with a scale 6, thus enabling the user to see how large a part of the plug gauge 4 extends outside the holder 5, see FIG. 2.

The "no go" gauge 2 has had the top of the thread removed, so that one can easier check the thread in a bore without ruining it.

An end cap 7 is screwed on to the housing 1 by means of a thread 10. The end cap 7 and the through-going spindle 2 are connected to each other in a fixed manner.

When the thread measuring tool according to the invention is to be used, one holds the housing 1, which can therefore be provided with a friction facing, e.g. it can be knurled or the like. The plug gauge extends out of the holder 5 a little, e.g. 2 mm, so that the scale 6 on the holder 5, which is read off against the edge of the housing, starts at 2 mm. One first tries with the "no go" plug gauge 3. If this check shows that the thread is apparently correct, one turns the measuring tool over and the plug gauge 4 is screwed into the threaded bore 9 which is to be checked. When screwing in the gauge 4, the surface 11 and the holder 5 will abut each other when the gauge has been screwed in the above-mentioned 2 mm. Further screwing in will result in the plug gauge holder 5 being fed telescopically up into the housing 1, see FIG. 2, until the gauge 4 can no longer be screwed in, and one can then read the depth of the thread direct from the scale 6.

The coil spring 8, which sits compressed between the end cap 7 and the plug gauge holder 5, provides suitable friction between the housing 1 and the holder 5, thus ensuring that the holder 5, which is disposed in the holder in a telescopic manner, is always either pressed against shoulder 12 in the housing, i.e. in its zero position, or pressed against the surface 11 of the workpiece when a thread is being measured.

By providing a sliding friction fit between the gauge holder 5 and the housing 1, it is ensured that dirt or swarf cannot enter the tool, thus enabling it to be used out in the workshop itself without risk of damage.

The spring 8 always presses the gauge holder 5 out into the zero position or the start position, in which the holder surrounds and covers the ground thread on the plug gauge 4. Thus protection against damage is also provided for the expensive profile-ground thread portion on the gauge when the tool is not being used, but is perhaps placed on a workbench together with other tools or articles.

The invention as described above has an ordinary scale 6 which, for example, can be engraved direct into the gauge holder 5 or printed on said holder in a known manner. It will be obvious that other methods of indicating the result of the measurement can be used. One can use, for example, an electronic reading device with a digital display which provides a direct indication of the depth of the thread measured by way of numbers.

Preferably, the parts are produced in aluminium, for example hard aluminium, or similar workable materials. The through-going spindle 2 with the two plug gauges 3 and 4 is, however, made of a material capable of being hardened, e.g. steel, the reason being that the two gauges must be very wear resistant, so that even with frequent use they maintain the desired tolerances.

It is claimed:

1. A thread measuring tool comprising:
   a hollow housing;
   a hollow plug gauge holder slidably and rotatably positioned within the lower end of said housing;
   shoulder means provided within said housing limiting the travel of said holder out of the lower end of said housing;
   a spring positioned within said housing urging said holder towards said shoulder means;
   a cap secured to the upper end of said housing;
   a spindle extending through said housing from above the cap at the upper end of said housing to below the lower end of said holder, the spindle secured to said cap; and
   a plug gauge provided at each end of said spindle.

2. The tool of claim 1 further comprising measuring means for measuring the longitudinal displacement of said holder away from said shoulder means.

3. The tool of claim 2 wherein said measuring means comprises a scale positioned on the exterior of said holder.

4. The tool of claim 1 wherein the lower plug gauge is a "go" plug gauge and the upper plug gauge is a "no-go" plug gauge.

5. The tool of claim 1 wherein said spring is a helical expansion spring positioned around said spindle.

6. The tool of claim 1 wherein said cap is threaded onto the upper end of said housing.

7. The tool of claim 1 wherein said housing is cylindrical.

8. The tool of claim 1 wherein the greater length of the exterior of said housing is substantially rectangular.

9. The tool of claim 1 wherein the exterior of said housing is provided with a friction facing.

10. A thread measuring tool comprising:
    a hollow housing;
    a hollow plug gauge holder slidably and rotatably positioned within the lower end of said housing;
    shoulder means provided within said housing limiting the travel of said holder out of the lower end of said housing;
    a spring positioned within said housing urging said holder towards said shoulder means;
    a cap secured to the upper end of said housing;
    a spindle extending through said housing from above the cap at the upper end of said housing to below the lower end of said holder, the spindle secured to said cap; and
    a plug gauge provided at each end of said spindle, whereby said plug gauge holder provides an automatic retractable protective sheath for the lower plug gauge, and provides means for continuous and automatic indication of the depth of a hole or bore under examination by the lower plug gauge.

11. A thread measuring tool comprising:
    a hollow housing having a substantially rectangular exterior for the greater part of its length, and having a cylindrical interior of larger diameter in the upper end of the housing and of smaller diameter in the lower end of the housing, creating an internal shoulder where the reduction in diameter occurs;
    a hollow plug gauge holder slidably and rotatably positioned within the lower end of said housing, the upper end of the holder having an external diameter slightly less than the interior diameter of the upper end of said housing, such that the travel of the holder out of the lower end of said housing is limited by the contact of the upper end of the holder with said internal shoulder, and the exterior of the holder having a scale positioned to measure the longitudinal displacement of the holder away from said internal shoulder;
    a cap threadably secured to the upper end of said housing;
    a spindle extending through said housing and said holder from above said cap at the upper end of said housing to below the lower end of said holder, the spindle secured to said cap, and the spindle terminating in an upper "no-go" plug gauge and a lower "go" plug gauge; and
    a helical spring positioned within said housing around said spindle, urging against said cap and urging said holder against said internal shoulder, whereby said holder provides an automatic retractable protective sheath for the lower plug gauge, and provides means for continuous and automatic measurement of the depth of a hole or bore under examination by the lower plug gauge.

* * * * *